Nov. 21, 1933.    F. W. BURGER    1,935,765
SPIDER FOR METAL WHEELS
Original Filed Aug. 10, 1925
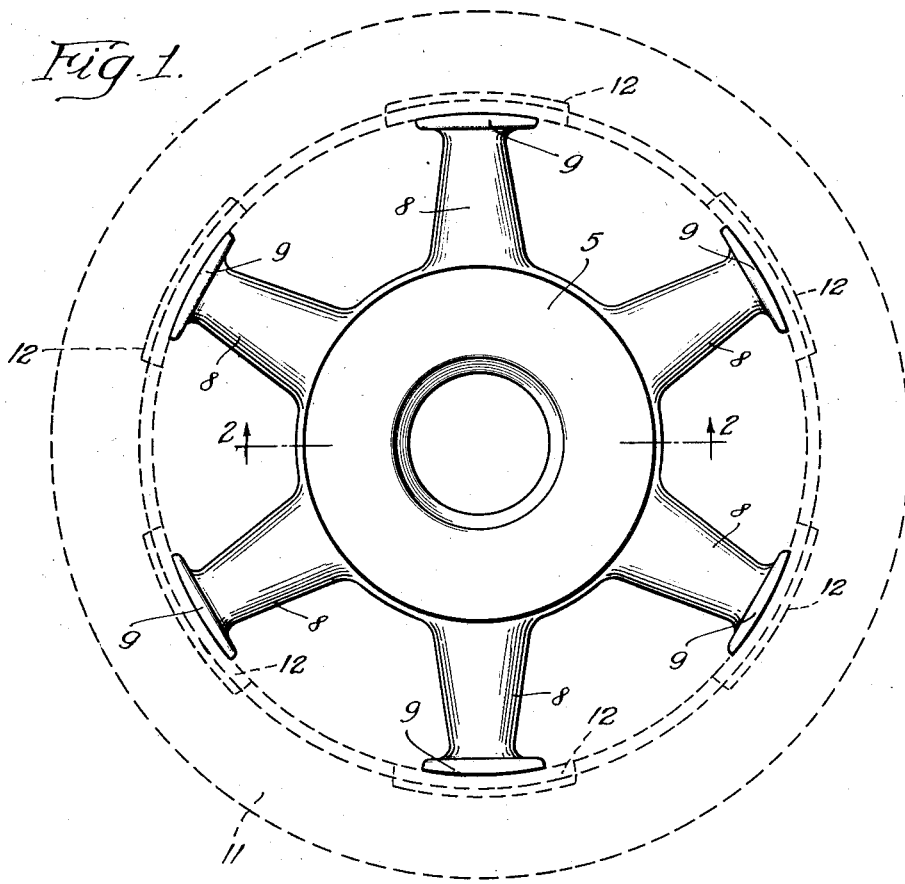
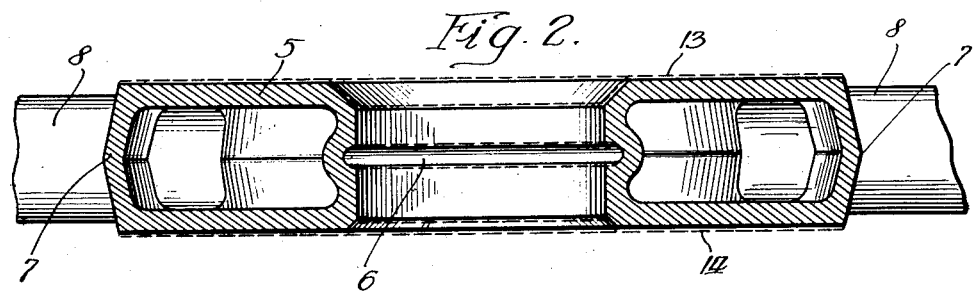
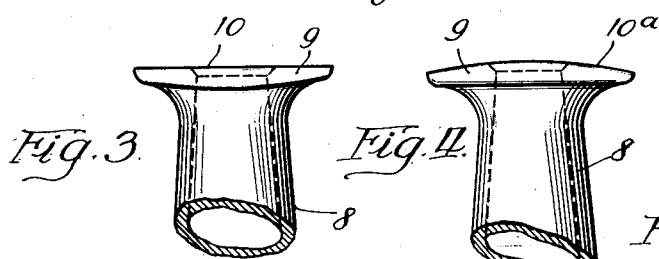
Inventor:
Frederick W. Burger.

Patented Nov. 21, 1933

1,935,765

UNITED STATES PATENT OFFICE 1,935,765

SPIDER FOR METAL WHEELS

Frederick W. Burger, Niles, Mich., assignor to Clark Equipment Company, Buchanan, Mich., a corporation of Michigan Original application August 10, 1925, Serial No. 49,161. Divided and this application November 27, 1929. Serial No. 410,019

8 Claims. (Cl. 301—65)

This invention relates to metal wheels of the type comprising a unitary hub and spoke portion fitted within a felloe in the form of an annular band that fits tightly upon the outer ends of the spokes. A wheel of this type constitutes the subject-matter of an application or Letters Patent filed May 29, 1925, by Edmund C. Mogford and myself, which application is Serial No. 33,657. Application No. 33,657 has matured into Patent No. 1,691,163, dated Nov. 13, 1928. In such wheel the hub and spoke portion is a casting in the form of a spider the center of which constitutes the hub portion of the spider, and the spokes are integral therewith and radiate therefrom. Both the hub portion of the spider and the spokes are preferably hollow, and the spokes are provided at their outer ends with laterally extending pads or flanges that bear against the inner surface of the felloe.

Wheels of this type are intended primarily for use on motor vehicles, and particularly heavy vehicles such as trucks, so that the wheels are subjected to great stresses and require a large factor of safety. Excessive weight, however, is highly undesirable, not only because increased weight means greater costs, but also because unnecessary weight increases the operating expense and reduces the facility with which the vehicle may be handled. Therefore, it is desirable that wheels for such vehicles be made as light as possible, consistent with safety.

As is well known, the wheels of motor vehicles are subjected to intense vibratory as well as other strains, and in the case of metal wheels great difficulty has heretofore been experienced in securing the felloe upon the hub and spoke portion of the wheel so that the felloe would not be loosened by such vibratory and other road strains.

In my pending application, Serial No. 49,161, filed August 10, 1925, for Method of making cast metal wheels, of which this application is a division, I have illustrated and described an improved method of finishing cast metal spiders so that the spider will be accurate in shape and dimensions, and ready to have a rim or felloe applied thereto by forcing the spider laterally into the felloe band under hydraulic pressure, as explained in said Mogford and Burger application, Serial No. 33,657, and my present application has to do with the spider produced preferably by following the method described in my said parent application, Ser. No. 49,161, which has matured into Patent No. 1,765,754, dated June 24, 1930, although it should be understod that a spider having similar characteristics but produced by any other suitable method comes within the scope of my invention.

According to the method described in my said parent application the casting constituting tne spider, which as has been said comprises a hollow hub portion and integral spokes radiating therefrom, the spokes being provided with laterally extending pads at their outer ends, is forced laterally into a ring die, the internal diameter of which corresponds to the external diameter of the finished spider. The outer faces of the pads are initially substantially flat or slightly curved, but by the forcing of the spider into the die they are curved to concentricity with the axis of the spider so that the spider may properly fit within the felloe which is afterwards to be applied to it.

During the latter part of the operation of shaping the outer surfaces of the pads the hub portion of the spider is compressed between upper and lower die blocks to a predetermined thickness, such compression being facilitated by bulging the inner and outer walls of the hub portion outwardly, or away from the hub axis. This bulging is best provided by making the outer wall of the hub portion substantially V-shape in cross-section, and making the inner wall thereof an ogee curve to provide a circumferential flute or groove in the inner or exposed face thereof. Thus under compression the outer wall, from which the spokes radiate, increases somewhat in diameter, although the inside diameter of the hub portion is not materially altered, as will be described hereinafter more in detail. The first step of forcing the spider into the circular die sizes and shapes all of the pads simultaneously, and in so doing sets up inwardly acting pressures in the entire spider. The second step of thereafter applying pressure to opposite sides of the hub portion in an axial direction sets up radial thrusting pressures in the spokes and pads that act outwardly in the spokes and tend to force the pads out against the sides of the die ring with an increased pressure. This naturally follows from the compression axially of the hub portion, owing to the fact that the outwardly bulged contour of the inner and outer walls of the hub and the considerable mass of metal therein provide a substantial truss that permits increase in the outside diameter of the hub portion under compression, but prevents inward contraction thereof.

Thus the latter step of compressing the hub portion serves the two-fold purpose of sizing and shaping the hub portion and also creating outwardly acting pressures in the spokes. One of the advantages gained by creating these outwardly acting pressures is illustrated in the case of a spider having one spoke slightly shorter than the others. Although the initial step of forcing the spider into the ring die may not subject such shorter spoke to the same amount of inwardly acting pressure as it will the other spokes, the secondary step of compressing the hub portion will set up outwardly acting pressures in the shorter spoke which will cause the same to be pressed outwardly against the circular die with the required pressure to shape and size the pad thereof correspondingly with the other pads. At no time in the entire die operation do either of the die parts contact with the intermediate portions of the spoke, and, hence, the spokes are only subjected to endwise pressing stresses which they are capable of sustaining without possibility of fracture. A further important advantage gained by creating these outwardly acting pressures or stresses is that after the spider has been inserted in the wheel rim or felloe, when the wheel is put in service the jar and vibration release some of the stresses set up in the spider with the result that it increases in diameter, so that it actually becomes tighter in the rim or felloe as it is being used, and is held more firmly than when the parts were originally assembled.

The purpose of shaping the inner and outer walls of the hub, as described, is three-fold; i. e. to facilitate axial compression of the hub portion in order to reduce it to the proper thickness as well as to make its upper and lower sides parallel and iron them out; to effect an increase in the external diameter of the hub portion under axial compression in order to set up the outwardly acting stresses in the spokes, for the purpose above stated, and to increase the resistance of the hub portion against inward radial stresses thereby making the hub as a whole stronger and more efficient.

As will appear from the claims appended hereto my present invention consists in a spider for metal wheels having the characteristic qualities above pointed out.

The accompanying drawing illustrates my improved spider and indicates part of the apparatus used in its production. In said drawing—

Fig. 1 is a plan view showing the finished spider in full lines and the ring die in dotted lines;

Fig. 2 is a partial transverse vertical section on line 2—2 of Fig. 1;

Fig. 3 is a fragmentary view of the outer end of one of the spokes of the spider before treatment; and Fig. 4 is a similar view showing a finished spoke end.

Referring to the drawing,—5 indicates the hub portion of a spider, which is shown as being hollow with flat top and bottom surfaces. The hub portion 5 comprises an inner wall 6, and an outer wall 7 concentric therewith, both of which are bulged outwardly, or away from the axis of the spider, as shown in Fig. 2, this being best accomplished by making the inner wall an ogee curve to provide a circumferential flute or groove 6$^a$ in its inner or exposed face depressed below the general level of the surface thereof, and making the outer wall 7 substantially of V-shape with the apex of the V outermost. Thus the thickness of the hub portion may be reduced slightly by axial compression, and under such compression its external diameter will be increased somewhat, but the inside diameter of its inner wall 6 will not be materially affected. By so shaping the walls of the hub portion they serve also to turn it against inward radial stresses and add strength to the spider to resist road shocks. Radiating from the outer wall 7 of the hub portion 5 are spokes 8 which, as shown, are hollow, and are provided at their outer ends with laterally projecting pads 9. Initially these pads have substantially flat outer surfaces 10, as shown in Fig. 3, but by pressing the spider laterally into a circular ring die 11, shown in dotted lines in Fig. 1, such outer surfaces of the pads are curved, as shown at 10$^a$ in Fig. 4, to conform to the inner surface of said ring die. The ring die is provided at appropriate points on its inner surface with hardened steel plates 12 against which the pads bear during the shaping operation. The dotted lines 13, 14 in Fig. 2 illustrate diagrammatically the initial thickness of the hub portion 5, and the remaining dotted lines in said figure are intended to indicate the nature of the changes brought about by the compression to which the hub is subjected.

By compressing the hub axially by lateral pressure as above described, while the spokes are confined circumferentially to limit the radial expansion or elongation thereof under such lateral pressure, the spider is not only finished to the proper dimensions as to the thickness of the hub portion, the shaping of the pads or other end surfaces of the spokes, and the diameter of the spider, so that it may be pressed laterally into a continuous felloe band, but also another phenomenon of materials under stress is utilized to advantage. It is known that when material is stressed there is produced a strain or deformation of the material. When the stress is removed, the material tends to recover partially or fully from the strain. Frequently the immediate recovery upon removal of the external force is only a part of the ultimate recovery and there remains a small temporary set from which the material recovers only very slowly, in many cases not until the material is subjected to some external force or to heat. This may be termed the "residual strain" of the material. The temporary set is in addition to any permanent set from which the material does not recover. When the compressive force on the spider of the present invention is released, resulting in a release of most of the strain in the material, there remains a residual compressive strain from which the material does not recover for days if left free of vibration or external heating. When the spider is inserted into a felloe the residual strain is still present and subject to release by the jar and vibration to which the wheel is subjected when in service, with the result that the diameter of the spider increases so that it becomes tighter in the rim with use instead of looser, as is the case with prior constructions. I have released the residual strain from a spider by tapping the same with a hammer for one minute, and found the diameter to have increased as much as .022 inches. A similar spider, pressed in the same manner and allowed to lie in the same temperature for four days, was found to have remained without increasing the outside diameter. In each case the diameter of the spider was $\frac{3}{16}$ inch oversize in the rough. The increase in diameter by tapping of the spider was about 10 per cent of the reduction that had been brought about by the sizing operation. A spider having these characteristics is, so far as I am aware, entirely new in this art.

By making the hub and spoke portions of the spider hollow and shaping the spider by compression as described a considerable saving of metal and reduction of weight with the advantages ensuing therefrom, and without reduction of the factor of safety, are realized.

It should be understood that the term "hub portion of the spider" as used herein refers to the central web-like part thereof that holds the inner ends of the spokes together, whether it be in the form of a definite wheel hub or not. The spider illustrated is one such as is used in the construction of rear wheels and is intended to have a forged hub applied thereto and bolted in place, but in the case of spiders for front wheels it is customary to cast the wheel hub integral with the spider. Either form comes within the scope of my invention.

I claim:

1. A cast metal spider for wheels comprising a hollow hub portion radially expanded by axial compression to increase its external diameter, and hollow spokes radiating from said hub portion and free of one another at their outer ends and under residual compressive strain.

2. A cast metal spider for wheels comprising a hollow hub portion having axially compressed inner and outer walls and integral spokes radiating from said outer wall and free of one another at their outer ends, said spokes having residual outwardly acting stresses therein.

3. A unitary cast metal spider for mounting in a felloe, comprising an axially compressed hub portion and spokes radiating therefrom and free of one another at their outer ends, said spokes having residual radial thrusting pressures set up therein that tend to tighten the spider in its felloe under the vibration incident to road shocks.

4. A unitary cast metal spider for insertion into a felloe to form a wheel, comprising a hollow hub having spokes integral therewith and extending radially outward therefrom and free of one another at their outer ends, said spider being under substantial residual compressive strain which is subject to release by vibration, to expand the spider radially, whereby the spider when operatively positioned in the felloe is tightened therein by the release of the residual strain under vibration incident to road shocks.

5. A unitary cast metal spider for insertion into a felloe to form a wheel, comprising a hollow hub having parallel spaced walls joined by concentric inner and outer walls, hollow spokes extending radially outward from the outer wall and free of one another at their outer ends, said outer wall being outwardly bulged and exerting an outward force on the spokes due to axial compression of the first mentioned walls toward one another, said spider being under substantial residual compressive strain which is subject to release by vibration, to expand the spider radially, whereby the spider is tightened in its felloe by the release of the residual strain under the vibration incident to road shocks.

6. A unitary cast metal spider for insertion into a felloe to form a wheel, comprising a hollow hub having side walls joined by concentric inner and outer walls, hollow spokes extending radially outward from the outer wall and free of one another at their outer ends, said outer wall being outwardly bulged so that axial compression of the first mentioned walls toward one another will exert an outward force on the spokes, said inner concentric wall comprising an axially extending cylindrical portion having a radially outwardly extending peripheral bead to prevent a substantial reduction in the internal diameter of the cylindrical portion upon an axially inward movement of the side walls.

7. A unitary cast metal spider for insertion into a felloe to form a wheel, comprising a hollow hub having parallel spaced walls joined by concentric inner and outer walls, hollow spokes extending radially outward from the outer wall and free of one another at their outer ends, said outer wall being outwardly bulged so as to exert an outward force on the spokes due to axial compression of the first mentioned walls toward one another, said inner concentric wall comprising an axially extending cylindrical portion having a radially outwardly extending peripheral bead to prevent a substantial reduction in the internal diameter of the cylindrical portion, said spider being under substantial residual compressive strain, the spider tending to expand radially when the strain is released, said strain being released by vibration, whereby the spider is tightened in its felloe by the release of the residual strain under the vibration incident to road shocks.

8. A metal spider for insertion into a felloe to form a wheel, comprising a hub portion having spokes radiating therefrom for separate engagement with the felloe, characterized by the presence in the spider, before the application of the felloe thereto, of imposed residual compressive strains that are releasable by vibration and tend to elongate the spokes and tighten the spider in the felloe when the wheel is subjected to road shocks.

FREDERICK W. BURGER.